United States Patent
Johnston et al.

(10) Patent No.: US 8,717,734 B1
(45) Date of Patent: May 6, 2014

(54) DISSIPATION OF ELECTROSTATIC CHARGE FROM SUBSTRATES

(75) Inventors: Scott R. Johnston, St. Louis, MO (US); John Koval, St. Louis, MO (US); Matthew M. Thomas, Maryland Heights, MO (US); Robert R. Johnson, Kirkwood, MO (US); Michael P. Gleason, Edwardsville, IL (US); Michael R. Miller, Lake St. Louis, MO (US); Gregory M. Sisti, Florissant, MO (US)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 13/316,913

(22) Filed: Dec. 12, 2011

(51) Int. Cl.
*H05F 3/00* (2006.01)

(52) U.S. Cl.
USPC .......................................................... 361/218

(58) Field of Classification Search
USPC .......................................................... 361/218
See application file for complete search history.

(56) References Cited

U.S. PATENT DOCUMENTS

| | | | | |
|---|---|---|---|---|
| 4,128,448 A | * | 12/1978 | Bitterice et al. | ............... 156/166 |
| 4,246,624 A | | 1/1981 | Lazelle | |
| 4,782,426 A | | 11/1988 | DeCamp et al. | |
| 4,831,491 A | * | 5/1989 | Mueller et al. | ................ 361/218 |
| 4,910,050 A | | 3/1990 | Oldham et al. | |
| 5,650,208 A | * | 7/1997 | Chaussade et al. | ............. 428/38 |
| 7,738,236 B2 | | 6/2010 | Stein | |
| 7,749,603 B2 | | 7/2010 | Graham et al. | |

OTHER PUBLICATIONS

Hucke, Herbert M.; "Precipitation-Static Interference on Aircraft and at Ground Stations"; Proceedings of the I.R.E., May 1939, pp. 301-316.

Huang, George C.; "Interference Characteristics of Streamer Discharges"; IEEE Transactions on Electromagnetic Compatibility; vol. EMC-12, No. 2; May 1970; pp. 54-63.

* cited by examiner

*Primary Examiner* — Scott Bauer
(74) *Attorney, Agent, or Firm* — Alston & Bird LLP

(57) ABSTRACT

The present disclosure is related to articles, such as aircraft windows and canopies, including a non-conductive substrate and a conductor pattern including one or more trace lines deposited onto the outside of the substrate such that the entire outside surface of the substrate is not coated with the conductor pattern. The present disclosure also provides methods of dissipating electrostatic charge from non-conductive substrates.

37 Claims, 8 Drawing Sheets

DISSIPATION OF ELECTROSTATIC CHARGE FROM SUBSTRATES

FIELD OF THE DISCLOSURE

The present disclosure is generally related to articles, such as aircraft canopies and windows, including a pattern of conductor trace lines deposited onto an outer surface of a non-conductive substrate for the dissipation of electrostatic charge.

BACKGROUND OF THE DISCLOSURE

As aircraft fly through certain environmental conditions, charges (i.e., precipitation static) can accumulate on dielectric components of the aircraft. Specific components of aircraft highly susceptible to the build-up of such electrostatic charge are transparencies such as windows, windshields, and canopies. These transparencies are typically formed from a dielectric acrylic material or the like. As such, these components can accumulate a significant charge over the course of a flight. In some instances the build-up of electrostatic charge reaches a potential great enough to induce discharge or "streamers" across the surface of the transparency.

Currently, aircraft maintainers are instructed to thoroughly "wipe" or "rub" the surface of the canopy or windshield prior to handling with a discharging wand to dissipate electrostatic charge via the discharging wand. This protocol, however, has several shortcomings. If, for example, the maintainer does not adequately rub the surface either due to insufficient contact or duration of time the accumulated electrostatic charge may not be sufficiently discharged.

For at least these reasons, there remains a need for a precipitation static dissipation process, in that wherever and however much electrostatic buildup occurs, the transparency can dissipate it to a safe level without a need to activate some external or auxiliary system to achieve this dissipation.

BRIEF SUMMARY

In one aspect, the present disclosure provides an article including a non-conductive substrate having an inner and outer surface. The outer surface has a conductor pattern deposited onto at least a portion of the outer surface. In certain embodiments, the conductor pattern includes one or more trace lines comprising a conductor material, such that the outer surface of the substrate is not completely coated or covered with the conductor material. The conductor material can include a transparent or semi-transparent conductor material, an opaque conductor material, a wire capable of allowing flow of electric current, or any combination thereof. Preferably, the conductor pattern is applied onto the substrate so as to dissipate electric charge with minimal impact on optical quality.

In another aspect, the present disclosure provides a method of dissipating electrostatic charge from a non-conductive substrate. In certain embodiments, the method can include a step of applying a conductor pattern of one or more trace lines onto at least a portion of a surface of the non-conductive substrate, such that the outer surface of the substrate is not completely coated or covered with the conductor material.

In yet another aspect, the present disclosure provides a method of providing an electrical current or power to the outside surface of a non-conductive substrate, such as a transparency on an aircraft, via a conductor pattern applied to the outside surface of the substrate. In certain embodiments, electrical current or power can be delivered to specific locations on non-conductive substrates, such as aircraft windows or canopies. The conductor pattern includes one or more trace lines of a conductor material.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

Figure 1A:
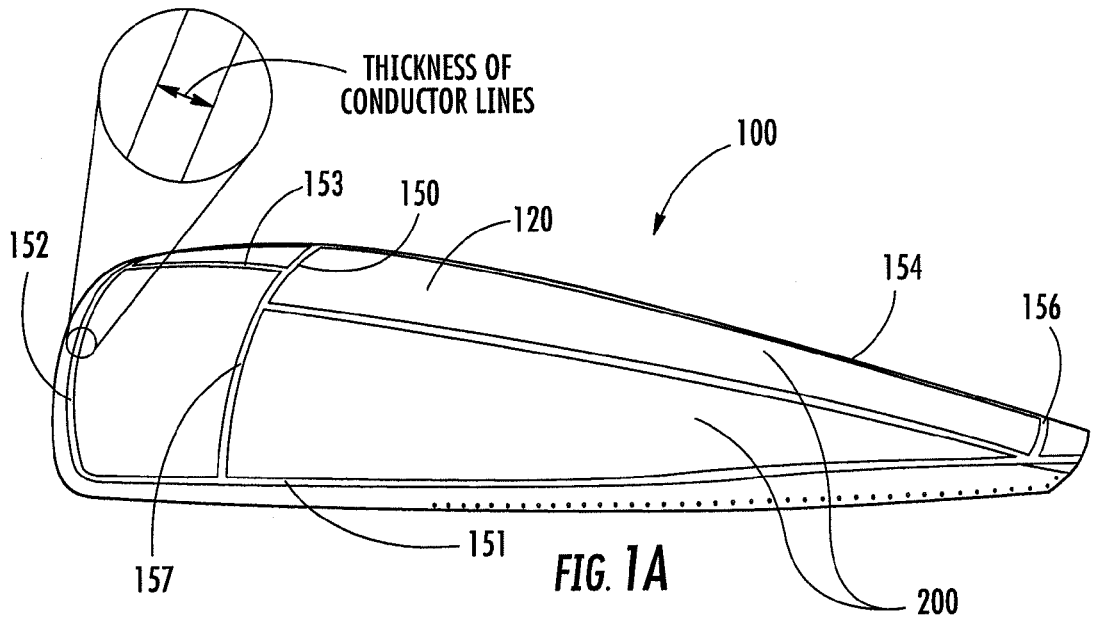
FIG. 1A is a side view of an aircraft canopy including a conductor pattern applied only to a portion of the canopy.

The present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

In one aspect, the present disclosure provides an article (e.g., windows, windshields, or canopies on manned or unmanned aircraft, spacecraft, or sub-orbital vehicles) that includes a non-conductive substrate (e.g., a dielectric material) having a partial or discontinuous coating of a conductor material applied or deposited onto the outer surface. That is, the conductor material (e.g., a dissipative surface treatment) does not coat the entire surface of the substrate. In certain embodiments, for instance, the article can include a first portion (e.g., the right side of a canopy) that is completely coated or completely uncoated while a second portion (e.g., the left side of a canopy) includes a conductor pattern comprising one or more trace lines deposited thereon. The trace lines comprise a conductor material. That is, the conductor pattern includes trace lines, preferably a plurality of interconnected trace lines, of material that allow the flow of electric current. The trace lines can be formed to have varying thickness (e.g., depth) and varying widths within the same pattern. For instance, a single trace line can include a plurality of portions having unique thicknesses and widths. Also, the conductor pattern can include multiple trace lines in which one trace line has a different thickness and/or width than another trace line. The conductor pattern can also include trace lines having a multitude of geometric configurations within the same pattern (e.g., linear trace lines, curved trace lines, or combinations thereof). Beneficially, portions of a substrate having a conductor pattern applied thereto are not completely covered with the conductor material. Therefore, the substrate as a whole is not completely coated or covered with the conductor material. In general, however, most (if not all) outer surface points of the substrate within a desired portion (which in some cases can be the entire substrate, but is usually less than the entire substrate) are no more than 24 inches (e.g., within 0-24 inches, within 0-18 inches, within 0-12 inches, within 0-6 inches) from at least one trace line with the proviso that not all (and in fact most) outer surface points within the desired portion are not coated or covered with a conductor material. Preferably, the conductor pattern is operatively (e.g., in electrical communication) connected to one or more discharge points located on the outer surface of the non-conductive substrate. Accordingly, certain embodiments provide the benefit of dissipating electrical charge while minimizing optical or visual quality in relation to transparent substrates. The conductor material can include a transparent or semi-transparent conductor material, an opaque conductor material, a wire capable of allowing flow of electric current, or any combination thereof. Preferably, the geometric configuration or pattern of the conductor pattern is applied onto the substrate so as to dissipate electric charge with minimal impact (if any) on optical quality, particularly for pilots. In certain preferred embodiments, the geometric configuration is such that the measurable optical angle of the trace lines in a desired portion (e.g., a specific section or portion of a canopy used by a pilot during landing) is minimized. As such, pilot distraction is minimized. Preferably, portions of trace lines deposited either within or proximate to a pilot design eye portion are preferably thinner in width and/or less thick than portions further from the pilot design eye. In this aspect of the present disclosure, the precipitation static dissipation process can be considered as a passive process, in that wherever and however much electrostatic buildup occurs, the article (e.g., transparency having a partial or discontinuous coating of a conductor material thereon) shall dissipate it without the pilot or maintainer having to activate some external or auxiliary system to achieve this dissipation.

In certain embodiments, articles including a non-conductive substrate having an inner and outer surface, in which a conductor pattern comprising one or more trace lines of a conductor material is deposited onto at least a portion of the outer surface of the non-conductive substrate. Preferably, the conductor pattern is operatively (e.g., in electrical communication) connected to one or more discharge points located on the outer surface of the non-conductive substrate. In certain embodiments, the conductor pattern comprises a plurality of interconnected trace lines such that only one discharge point can be utilized. Alternatively, however, the conductor pattern can include multiple discharge points. If desired, for instance, the conductor pattern can comprise a series of distinct and separate trace lines (e.g., the trace lines are not interconnected or at least some of the trace lines are not interconnected) each connected to a respective discharge point.

Although the substrate is not necessarily limited, in certain preferred embodiments, the substrate can comprise a transparent or semi-transparent material. In certain embodiments, the transparency of the substrate can range from 1-100%, 50-100%, 60-100%, 70-100%, 80-100%, or 90-100% when measured at normal angles of incidence to the surface. For example, the substrate can comprise any glass, transparent plastics such as polycarbonates, acrylics, stretched acrylics, and the like. In certain embodiments, the substrate comprises a transparent substrate known for use in aircraft windows, windshields, and canopies. As such, in certain preferred embodiments, the substrate comprises an aircraft window, windshield, or canopy.

The conductor material used to form the conductor pattern can, in some respects, comprise any material that allows the flow of electric current. For example, the conductor material can comprise a wide variety of materials or compositions. The conductor material, for instance, can include a transparent material, semi-transparent material, an opaque material, wire, or any combination thereof. In certain embodiments, the conductor material comprises an electrically conductor polymer, polymer blend, or doped polymer system. Additionally, the conductor material can comprise a single or multi-layer coating. One specific example of a suitable conductor material includes indium tin oxide (ITO), which can be incorporated into a variety of single or multi-layer coating schemes. Resistance values for ITO can range significantly. For instance some sources list a range of 5-500 ohms/square, while others list 2000-10,000 ohms/square. Actual values are inevitably a function of what else accompanies the ITO, material-wise. Other non-limiting examples of suitable conductor materials include, but are not limited to, poly(3,4-ethylenedioxythiophene (PEDOT) in resins (e.g., polyurethane resin) such as ACC4202 (translucent to semi-transparent with a transparency greater than 90% and a conductivity of $10^3$-$10^8$ ohms/square) and ACC4244 (translucent to semi-transparent with a transparency greater than 90% and a conductivity of $10^3$-$10^5$ ohms/square) commercially available from Crosslink™ (USA). Other suitable materials include tin oxide nanoparticles in resins (e.g., polyurethane resin, polymethyl methacrylate resin). Suitable conductor materials having tin oxide nanoparticles in polyurethane can be obtained from SciCron Technologies (USA) having a luminous transmission of greater than 90%. One example of a suitable conductor material having tin oxide nanoparticles in polymethyl methacrylate is NOXTAT SDG ($10^6$-$10^8$ ohms/square) available from ACP NOXTAT, LLC (Santa Ana, Calif., USA). Additional materials suitable for embodiments of the present disclosure include carbon nanotube coatings (e.g., CNT's embedded in resin). Such CNT-based materials are available from Eikos, Inc. (Massachusetts, USA).

In certain preferred embodiments, the trace lines of the conductor pattern are formed from a semi- to highly-transparent conductor material. In such embodiments, the overall transparency of the locations of the article that are covered or coated with the trace lines is not significantly reduced. That is, the trace lines do not substantially lower the overall transparency at the portions of the article (e.g., canopy or windshield) covered by the trace lines. For examples, the overall transparency at the portions of the article covered by the trace lines can range from 50-100%, 60-100%, 70-100%, 80-100%, or 90-100% when measured at normal angles of incidence to the surface. Preferably, the trace lines do not lower the overall transparency at the portions of the article covered by the trace lines at all when measured at normal angles of incidence to the surface. In other embodiments, however, the trace lines do not lower the overall transparency at the portions of the article covered by the trace lines by more than 20%, 15%, 12%, 10%, 8%, 5%, or 3% when measured at normal angles of incidence to the surface.

In certain embodiments, a small-diameter opaque wire can be embedded into the outer mold line of the transparency for precipitation-static dissipation purposes (or alternatively for supplying power). In such embodiments, a highly conductive metal such as silver or copper or some similar metal whose conductivity is on the order of 10^7 mho/meter is preferably used. In preferred embodiments, the diameter of the wire is minimized to mitigate the adverse impact upon pilot vision (and yet make it just visible enough for the maintainers to see). In such instances, these embodiments maximize the conductivity of the wire chosen, so, that choice is based upon the metal chosen.

As discussed previously, articles according to the present disclosure can include a conductor pattern comprising one or more trace lines. In certain preferred embodiments, the conductor pattern is deposited only onto a desired portion of the substrate in which dissipation of electrostatic discharge is desired. For example, an application may not need dissipation of electrostatic charge from the entire surface of a substrate and, therefore, the conductor pattern would not need to be applied at or in the vicinity of such a section of the substrate. However, portion(s) of the substrate in which electrostatic dissipation is desired while not wishing to coat the entire surface thereof with a coating of a conductor material can be treated with a conductor pattern according to embodiments of the present disclosure to achieve such twin aims. Conductor patterns can include one or more trace lines of a conductor material(s) such that the geometric configuration of the conductor pattern effectively dissipates the build-up of electrostatic charge in an acceptable timeframe (e.g., 1-20 minutes), while also minimizing the visual impact to a pilot or the like. That is the optical quality of the substrate (e.g., aircraft canopy) can be maintained to a desired level for conducting routine flying and landing while also providing a means for dissipating any precipitation static that may accumulate during flight to a safe level for any grounds-crew that may need to engage the canopy.

In certain embodiments, the conductor pattern is applied to effectively cover all points within a desired portion of the substrate. That is, the conductor pattern can provide electrostatic dissipation for all outer surface points of the substrate within the desired portion in accordance with embodiments of the present disclosure. In certain embodiments, for instance, all outer surface points of the substrate within the desired portion (which in some cases can be the entire substrate) are no more than 24 inches (e.g., within 0-24 inches, within 0-18 inches, within 0-12 inches, within 0-6 inches) from at least one trace line, with the proviso that not all (and in fact most) outer surface points within the desired portion are not coated or covered with a conductor material. That is, not all outer surface points within the desired portion have a conductor material applied thereon, but instead remain uncoated and generally proximate (as set forth above) to trace lines comprising a conductor material.

In certain embodiments, the trace lines can comprise a width ranging from 100 to 20,000 microns, 100 to 15,000 microns, 100 to 10,000 microns, 100 to 5,000 microns, 100 to 2500 microns, or 100 to 1000 microns. In certain embodiments the width of a single trace line can vary. That is, a single trace line can have multiple portions each having a unique width. For example, a trace line can have a first width section having a width of around 10,000 microns and a second width portion located elsewhere having a width of around 500 microns. Certain embodiments can also include a plurality of trace lines including a first trace line generally having a smaller width than a second trace line.

Similarly, in certain embodiments, the trace lines can comprise a thickness or deposition depth ranging from 1 to 200 microns, 1 to 150 microns, 1 to 100 microns, 1 to 50 microns, 1 to 20 microns, or 10 to 100 microns. In certain embodiments the thickness of a single trace line can vary. That is, a single trace line can have multiple portions each having a unique thickness. For example, a trace line can have a first thickness section having a thickness of around 150 microns and a second thickness portion located elsewhere having a thickness of around 25 microns. Certain embodiments can also include a plurality of trace lines including a first trace line that is generally greater than the thickness of a second trace line.

In addition to including the possibility of a variety of widths and thickness of the trace line(s) throughout the conductor pattern, the conductor pattern can include trace lines having a multitude of geometric configurations within the same pattern. For instance, a conductor pattern can include linear trace lines, curved trace lines, or combinations thereof. In certain embodiments, however, the conductor pattern includes only linear trace lines, while in other embodiments only curved trace lines can be used.

In certain embodiments, the conductor pattern includes at least one trace line comprising a varying width including a first section width and a second section width in which the first section width is smaller than the second section width. In accordance with certain embodiments, several (or in some instances any) trace lines having all or a portion thereof deposited in or proximate to a pilot design eye portion of the non-conductive substrate have the first section width located in or proximate to the pilot design eye portion and the second section width located outside of the pilot design eye portion of the non-conductive substrate. Such a geometric configuration can beneficially provide effective dissipation of electrostatic discharge, while minimizing the visual impact (e.g., measurable optical angle) for a pilot when flying and/or landing an airborne vehicle (e.g., aircraft or spacecraft).

The pilot design eye portion of a windshield or canopy can include any specific portion of the entire substrate (e.g., canopy) that a pilot may need to look through to locate a landing strip or aircraft carrier and/or align the aircraft with the landing area. By way of one example, F/A-18 pilots typically locate and view an aircraft carrier in preparation for landing through a portion of the left side of the canopy. As such, certain embodiments have the pilot-left sides of the canopy clearer of optical eye-catchers. Accordingly, embodiments related to such canopies (or the like) will have a pilot design eye portion located on the left side of the canopy. By minimizing the visual impact (e.g., measurable optical angle) at and/or around this portion of the canopy, the distraction level for a pilot is mitigated or eliminated altogether.

As understood by one skilled in the art, all aircraft transparencies have a "design eye" associated with them, for transparency (and other) design purposes. The "design eye" concept arises from the ergonomic accommodation of the pilot (and co-pilot, in the case of a two-seater) in the cockpit. Given the design of the cockpit and of the aircraft, and given average and standard deviation values of human factors such as height, waist-to-head length, weight, and other physical characteristics of the pilot corps, the design eye(s) represent(s) a best approximation of the average x/y/z-coordinate location of pilot eye within the cockpit. A design eye, therefore, is a property used for design purposes. In terms of transparency optics, for instance, it is very useful for locating the boundaries between visual and non-visual areas on each transparency from the pilot perspective. Accordingly, the design eye is a specific spatial location, with x-, y-, and z-dimension coordinate points defined relative to the transparency, and defined so as to quantify human-machine (pilot-transparency) distances for the subsequent determination of angular deviation and other optical/non-optical properties of the transparencies. Depending on the specific geometry of the transparency (e.g., windshield or canopy), the design eye can be located either outside or inside the transparency. In terms of canopies, for example, the design eye can be located within the enclosed canopy or outside of the canopy depending on the particular geometry of the canopy in question. Furthermore, skilled artisans can readily identify/locate the design eye of a particular transparency.

In certain embodiments, the conductor pattern includes at least a first trace line and a second trace line, in which the first trace line has a smaller width than the second trace line. In accordance with certain embodiments of the present disclosure, several (or in some instances any) trace lines in or proximate to a pilot design eye portion of the non-conductive substrate have a smaller width than trace lines outside of the pilot design eye portion of the non-conductive substrate. Such embodiments also facilitate the mitigation of negatively impacting the visual impact (e.g., measurable optical angle) for a pilot when flying and/or landing an aircraft. By minimizing the visual impact (e.g., measurable optical angle) at and/or around this portion of the canopy, the distraction level for a pilot is mitigated or eliminated altogether.

In certain embodiments, the conductor pattern includes a trace line(s) comprising a varying thickness including a first section thickness and a second section thickness in which the first section thickness is thinner than the second section thickness. Preferably, any (or at least one) trace lines having all or a portion thereof deposited in or proximate to a pilot design eye portion of the non-conductive substrate have the first section thickness located in or proximate to the pilot design eye portion and the second section thickness located outside of the pilot design eye portion of the non-conductive substrate. By minimizing the visual impact (e.g., measurable optical angle) at and/or around this portion of the canopy, the distraction level for a pilot is mitigated or eliminated altogether.

In certain embodiments, the conductor pattern includes at least a first trace line and a second trace line, in which the first trace line has a thinner thickness than the second trace line. Preferably, any trace lines (or at least one) in or proximate to a pilot design eye portion of the non-conductive substrate have a thinner thickness than trace lines outside of the pilot design eye portion of the non-conductive substrate. By minimizing the visual impact (e.g., measurable optical angle) at and/or around this portion of the canopy, the distraction level for a pilot is mitigated or eliminated altogether.

According to certain preferred embodiments, a conductor pattern is positioned onto a substrate to provide effective electrostatic dissipation for a desired portion (in some cases the desired portion includes the entire substrate), while minimizing the visual distraction to a pilot. In such embodiments, the geometric orientation, widths of the trace lines, and thicknesses of the trace lines are configured to minimize the visibility (e.g., minimize the measurable optical angle) of the conductor material (or interface/demarcation between the conductor material and the substrate) by a pilot or backseater. By way of explanation only, if one views a pencil lengthwise (e.g., eraser on the left and lead tip on the right) the visual cross-section realized is substantially larger than if viewed down the axis of the pencil. Embodiments according the present disclosure can incorporate this conceptual approach to configure the geometric orientation of the conductor plane, widths of the trace lines, and thicknesses of the trace lines to minimize the visual cross-section realized by a pilot or backseater, particularly with respect to a desired portion such as the pilot's design eye. Accordingly, the conductor pattern is preferably deposited in a configuration and/or orientation on an aircraft canopy or windshield so as to minimize the visual angle of the conductor pattern for an individual within a cockpit of the aircraft.

Articles according to certain embodiments of the present disclosure, preferably comprise a conductor pattern that is configured, as described above, such that an initial surface charge of 100 kV can be dissipated to between 1 and 40 kV (e.g., between 1 and 20 kV, between 5 and 20 kV, or between 10 and 20 kV) in a time period ranging from 1 to 25 minutes (e.g., 3 to 20 minutes, 5 to 20 minutes, 10 to 20 minutes, 15 to 20 minutes, or 3 to 10 minutes). In several applications, an immediate dissipation of all electrostatic charge is not needed to provide a safe working environment for a member of a grounds-crew that will need to handle the article (e.g., canopy, window, or windshield).

Figure 1B:
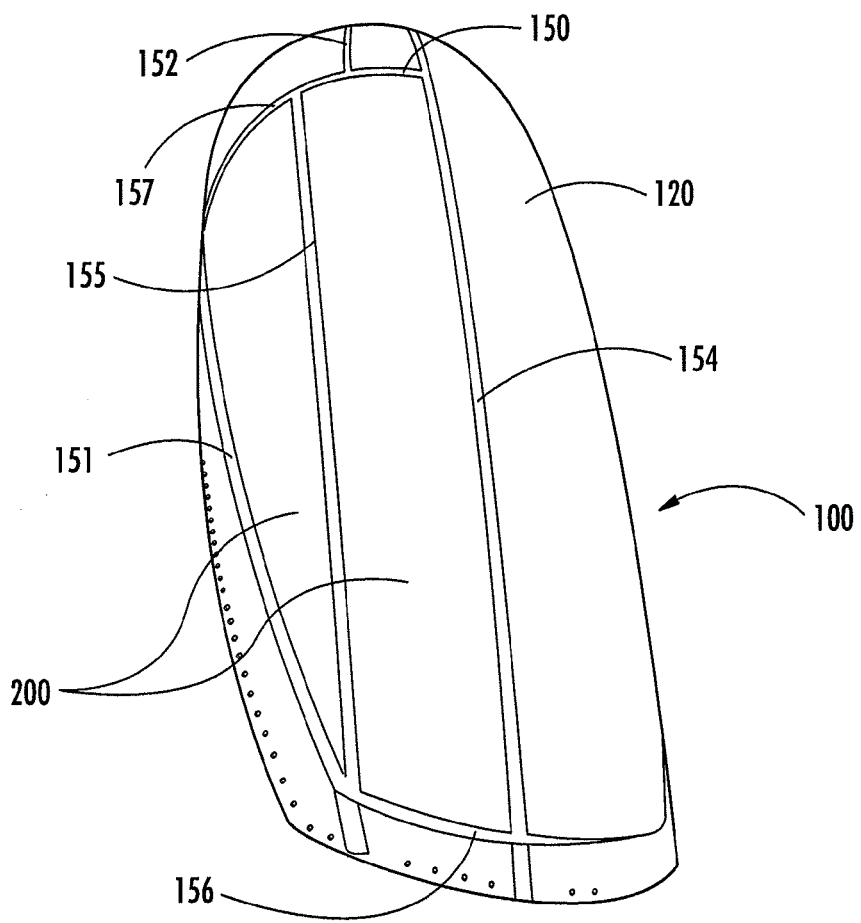
FIG. 1B is a rear view of the canopy shown in FIG. 1A.

FIGS. 1A and 1B show a single-place canopy 100 according to merely one specific embodiment according to the present disclosure. The canopy 100 comprises a transparent substrate 120 having a conductor pattern 150 deposited thereon. In this particular embodiment, the conductor pattern 150 includes several linear trace lines 151, 152, 153, 154, 155, 156, 157. As illustrated in FIGS. 1A and 1B, the conductor pattern does not coat or cover all outer surface points of the substrate. In actuality, most of the outer surface points, even within the desired portion for electrostatic dissipation, remain as uncoated portions 200. Since the design eye for this canopy is inside the canopy and FIGS. 1A and 1B only illustrate the external surface of the canopy, the design eye for this canopy is not illustrated in FIGS. 1A and 1B.

Figure 2:
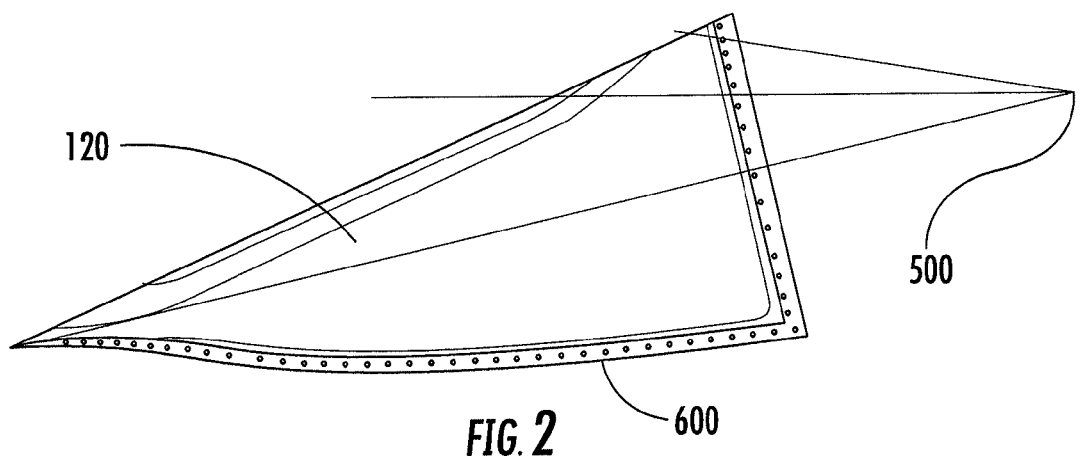
FIG. 2 illustrates the location of the design eye relative to the transparency of an aircraft windshield.
Figure 3:
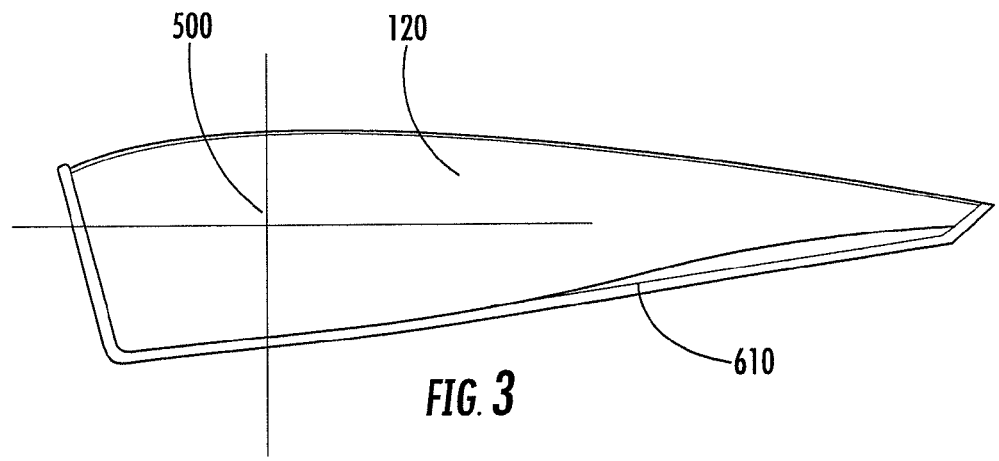
FIG. 3 illustrates the location of the design eye relative to a single-place canopy which is located behind the windshield of a single-seat aircraft.
Figure 4:
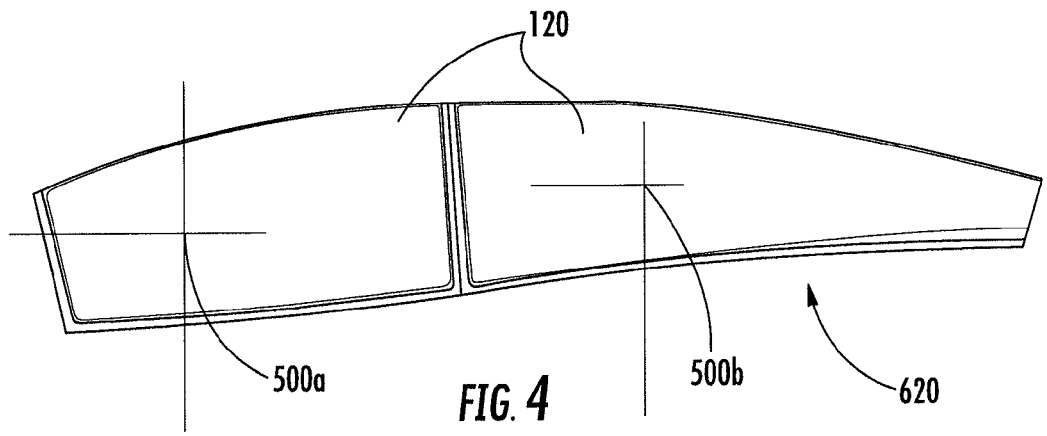
FIG. 4 illustrates the locations of the two design eyes relative to a two-place canopy of a two-seat model of an aircraft.

FIGS. 2-4 illustrate the location of one or more design eyes associated with differing models of an F/A-18. At the outset, it should be noted that each of FIGS. 2-4 illustrate a center slice through each transparency 120. Each design eye 500 is, therefore, in the center of each transparency 120 (not on pilot-left, nor on pilot-right, but in the center). In other words, each of FIGS. 2-4 are in the y-z Cartesian place, with the x-axis coming out of (pilot-left) and going into (pilot-right) the paper. Each design eye 500, then, is at x=0.

FIG. 2 illustrates the location of the design eye 500 relative to the transparency 120 of an F/A-18 windshield 600. FIG. 3 illustrates the location of the design eye 500 relative to a transparency 120 of a single-place canopy 610 which is located behind the windshield 600 of a single-seat model of an F/A-18. FIG. 4 illustrates not a single-place canopy, but the two-place canopy ("forward" at left; "aft" at right) which is on the two-seat models of the F/A-18. FIG. 4 also illustrates the locations of the two design eyes 500a (pilot design eye) and 500b (back-seater design eye) relative to a two-place canopy 620 of a two-seat model of an F/A-18. That is, FIG. 4, illustrates not only the same design eye for the pilot 500a (the leftmost design eye), but also the design eye 500b for the co-pilot or "backseater" (the rightmost design eye).

In another aspect, the present disclosure provides methods of dissipating electrostatic charge from a non-conductive substrate (e.g., an acrylic aircraft windshield or canopy). In certain embodiments, the method includes a step of applying a conductor pattern in accordance with embodiments of the present disclosure onto at least a portion of the non-conductive substrate. Preferably, the conductor pattern comprises one or more trace lines of a conductor material(s) that are connected to one or more electric discharge points.

In accordance with certain embodiments, the step of applying the conductor pattern onto the non-conductive substrate includes depositing the pattern only onto a desired portion of the substrate in which dissipation of electrostatic discharge is desired. Application of the conductor pattern (e.g., pattern of trace lines) onto the non-conductive substrate can be accomplished by spray-coating, tape application, direct writing, brushing, localized combination of spot heating and pressurization, or any combination thereof.

As discussed previously, the conductor pattern is preferably applied in an orientation or configuration onto the substrate (e.g., aircraft canopy or windshield) so as to minimize the visual angle of the conductor pattern for an individual within a cockpit, for example, of an aircraft.

In certain embodiments of the present disclosure the trace lines are formed by a direct writing process. Compared to spray/flow coating, the direct writing process can provide much tighter or crisp-edged trace lines which allows for not only a more precise application of the trace lines, particularly when applying a conductor pattern to curved transparencies, but utilization of more complex patterns including a variety of widths, thicknesses and geometries (e.g., curves, waves, etc.). Surfaces to be spray/flow coated or subjected to direct writing have their distinctive geometries—some are simple; some are complex. For instance, some windshields are generally relatively simple, insofar as they often incorporate a simple curved surface (e.g., based upon a simple right-circular cone). Some canopies, on the other hand, can be relatively complex if they incorporate nonlinear changes in surface position in more than one direction. Even more complex surfaces for coating include hybridizations of flat surfaces and curved surfaces. Although spray coating applications methods can be used on such complex surfaces, direct writing is preferred.

In yet another aspect, the present disclosure provides a method of providing an electrical current or power to the outside surface of a non-conductive substrate, such as a transparency on an aircraft, via a conductor pattern applied to the outside surface of the substrate. In certain embodiments, electrical current or power can be delivered to specific locations on non-conductive substrates, such as aircraft windows or canopies. The conductor pattern includes one or more trace lines of a conductor material. In certain embodiments, the ability to deliver electrical power to specific transparency locations can possibly provide synthetic and/or enhanced vision applications for aircraft or the like.

In the first aspect of the present disclosure, the precipitation static dissipation process is a passive process, in that wherever and however much electrostatic buildup occurs, the transparency can dissipate it without the pilot or maintainer having to activate some external or auxiliary system to achieve this dissipation. In the this particular aspect of the present disclosure, though, the conductor pattern (particularly and preferably as deposited through direct writing) also provides the infrastructure to supply electrical current to designated portions of the substrate (e.g., transparency). Research is ongoing to develop very small-scale active devices (e.g., "microsensors", "nanosensors", etc.) which could ultimately be embedded within airborne transparencies to perform various roles as sensors, actuators, and other active elements. Regardless of whatever their final exact roles, they will need incoming power and/or a route through which to send outgoing signals (e.g., information from such sensors). Beneficially, certain embodiments according to the present disclosure can be utilized to supply such power and routes to specific predetermined locations on transparencies including windshields and canopies.

In certain embodiments according to the present disclosure, the conductor pattern also provides the infrastructure to supply electrical current to designated portions of the substrate (e.g., transparency) for purposes of de-icing the substrate. Accordingly, the present disclosure also provides methods of de-icing a substrate (e.g., windows, windshields, canopies, etc.).

EXAMPLES

A series of experiments were performed to evaluate the dissipation of precipitation static (e.g., electrostatic charge) by using a variety of application methods for positioning the conductor material onto non-conductive substrates, different dimensions of trace lines, and various conductor materials.

For each test a 3'×3' acrylic transparent test panel having a thickness of 0.25" was electrically charged to a set voltage with a charging wand. After charging, the charging wand was removed and a non-contact voltmeter was used to measure voltage at the center of the panel. The voltage was recorded over time.

Figure 5:
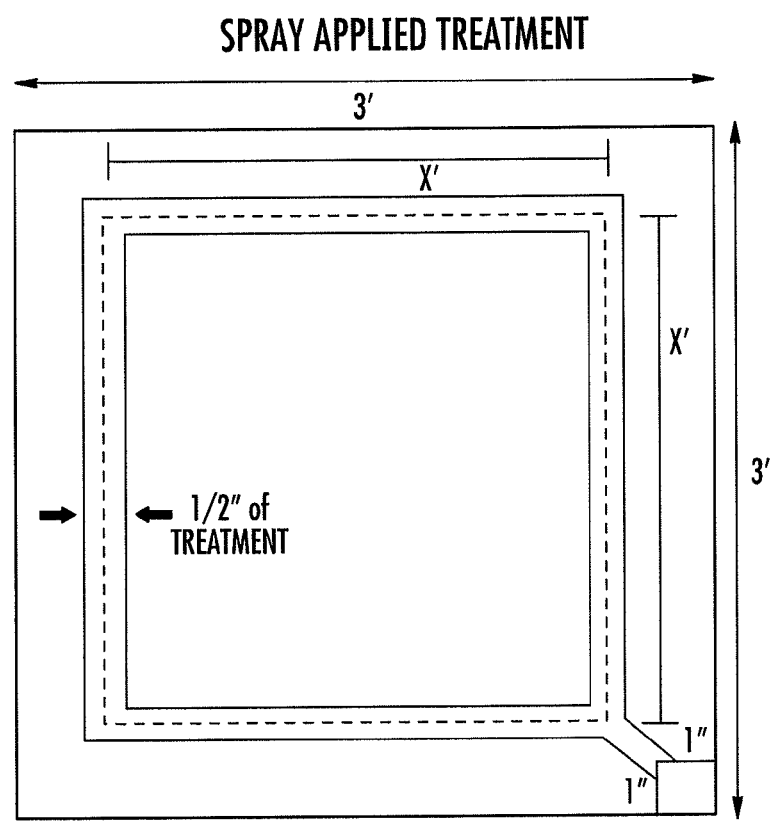
FIG. 5 illustrates a spray coated conductor pattern applied to a non-conductive panel.
Figure 6:
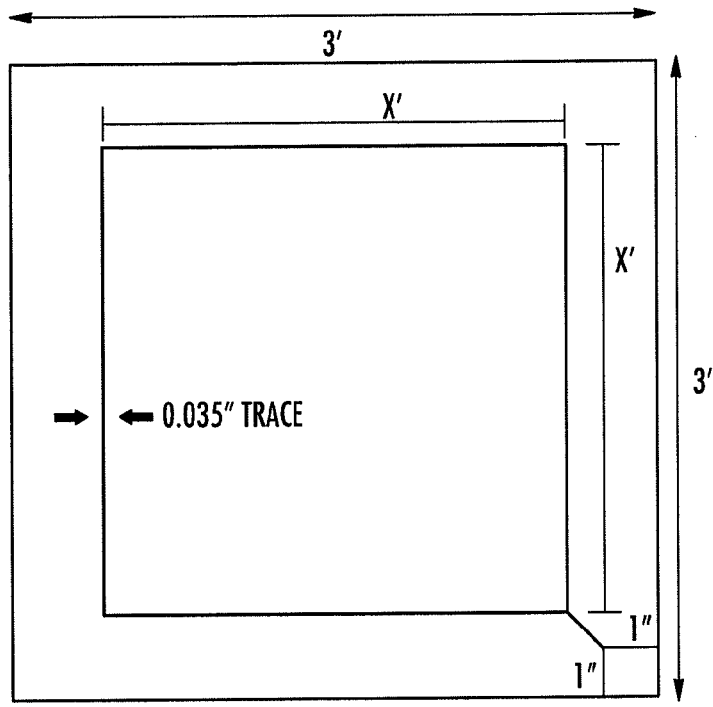
FIG. 6 illustrates a direct write conductor pattern applied to a non-conductive panel.
Figure 7:
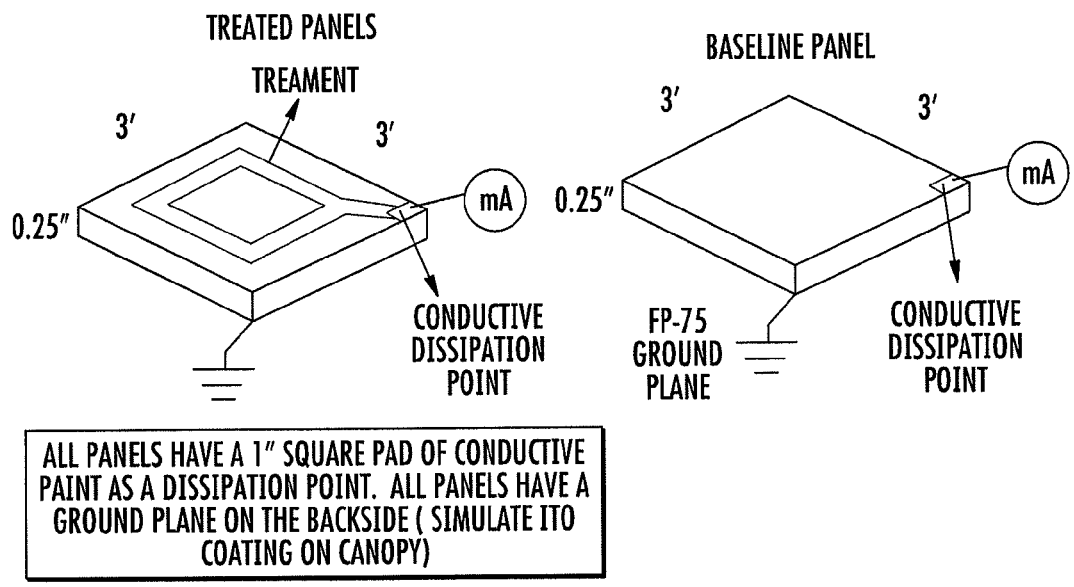
FIG. 7 illustrates a non-conductive panel having a conductor pattern connected to a conductive dissipation point in comparison to a baseline panel being devoid of a conductor pattern.

FIG. 5 illustrates a generally rectangular conductor pattern applied to a test panel by spray application, in which each of the trace lines has a width of ½". A short trace line connects the rectangular portion of the conductor pattern to a 1"×1" conductive dissipation point. FIG. 6 illustrates a test panel having a similar conductor pattern applied thereon. In FIG. 6, however, the conductor pattern was applied by direct writing and the trace lines were merely a matter of microns wide. FIG. 7 generally illustrates a non-conductive panel having a conductor pattern connected to a conductive dissipation point in comparison to a baseline panel being devoid of a conductor pattern. Each of the panels tested, as shown in FIG. 7, included a 1" square pad of conductive paint as a dissipation point and a conductive ground plane on the backside of the panel.

Figure 8:
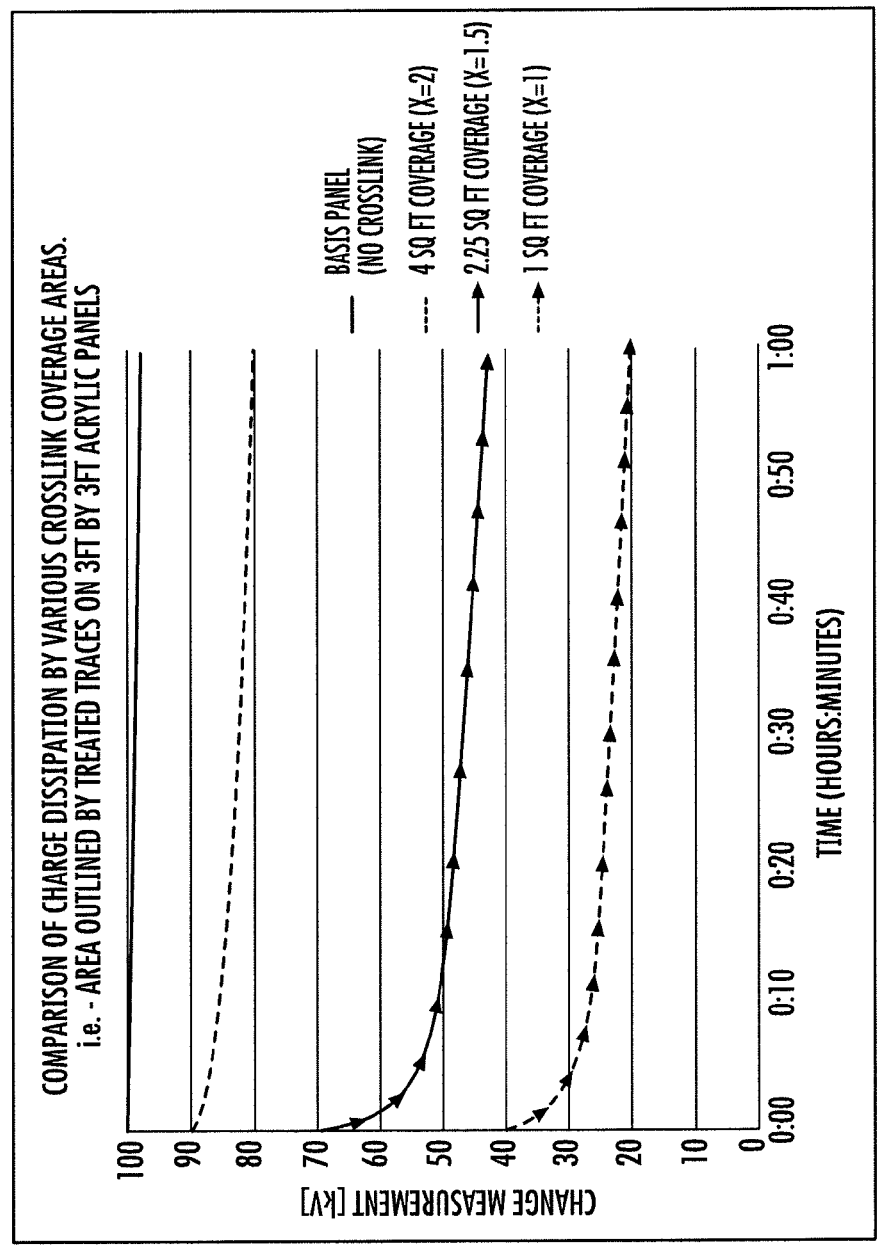
FIG. 8 shows comparative charge measurements for a variety of spray coated conductor patterns comprising a two-coat Crosslink material system.
Figure 8:
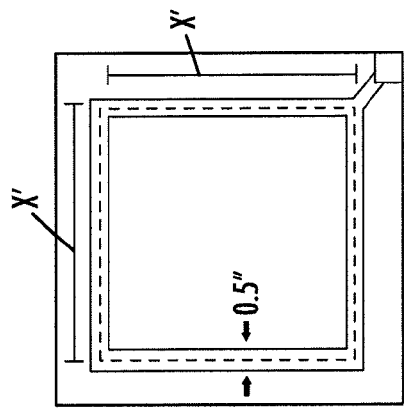

FIG. 8 shows comparative charge measurements for a variety of spray coated non-conductive patterns pattern sizes (e.g., different sizes of the generally rectangular conductor pattern). The conductor pattern was formed of trace lines that were applied by spraying and had a width of approximately ½". The conductor material used in this embodiment comprised a two-coat material system using a conductive polymer comprising PEDOT in a polyurethane resin from CROSSLINK (USA). More specifically, the trace lines were provided as a multi-layering coating that consisted of two ACC 4244 applications plus one ACC 4202 application as the outermost layer). As shown by the data in FIG. 8, the smaller patterns provided a higher level of charge dissipation. The baseline panel provided essentially no level of charge removal.

Figure 9:
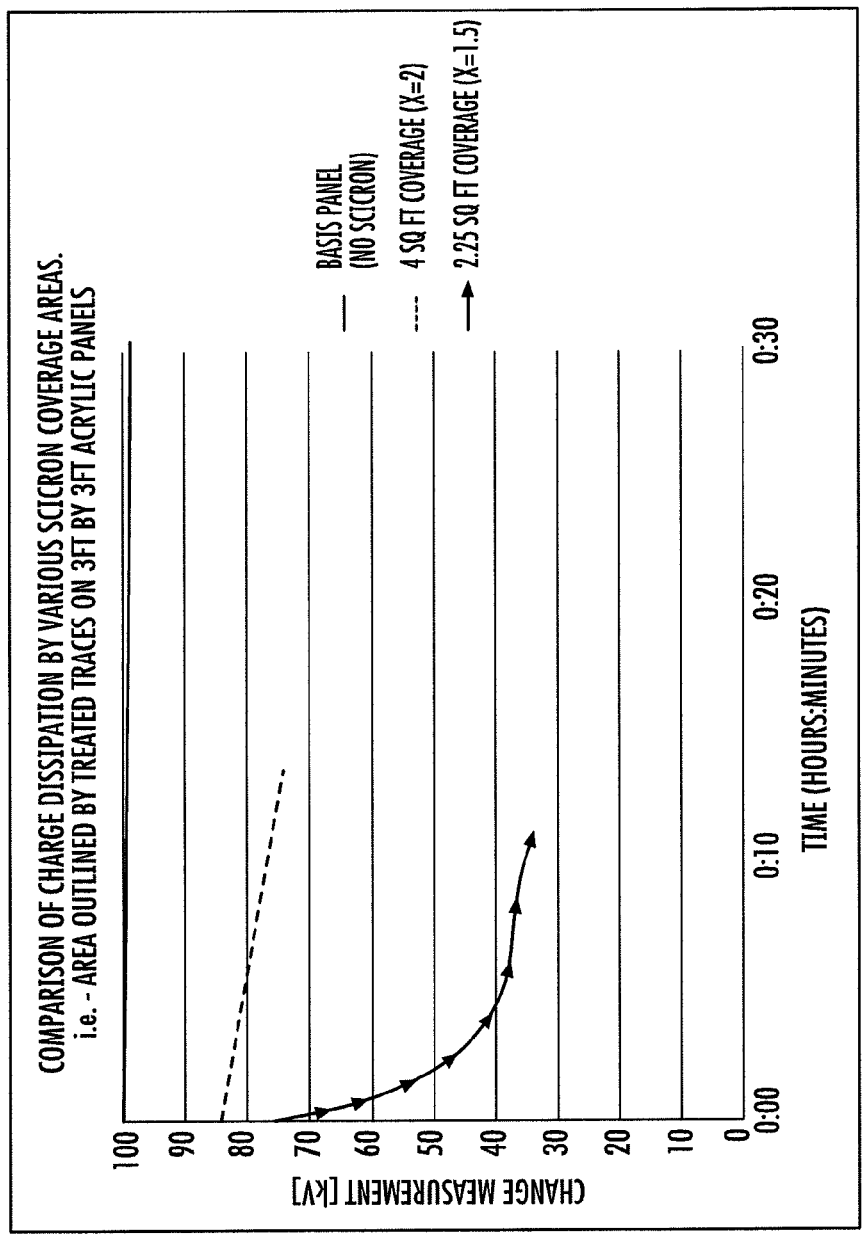
FIG. 9 shows comparative charge measurements for a variety of spray coated conductor patterns comprising SciCron C-300 material.

FIG. 9 shows comparative charge measurements for a variety of spray coated non-conductive patterns (e.g., different sizes of the generally rectangular conductor pattern) comprising SciCron C-300 material (available from SciCron Technologies, USA). The widths of the trace lines were approximately ½". Again, the smaller patterns provided a higher level of charge dissipation while the baseline panel provided essentially no level of charge removal.

Figure 10:
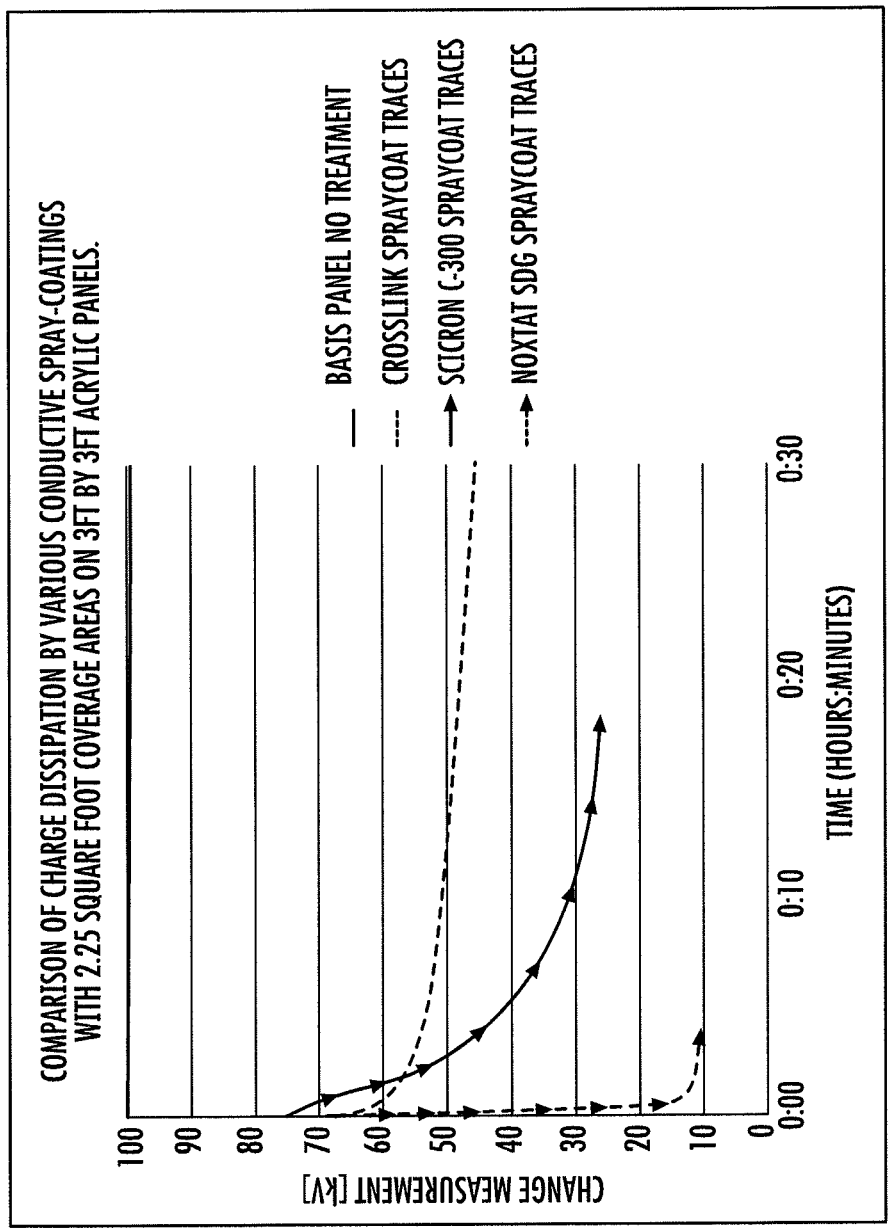
FIG. 10 shows comparative charge measurements for a variety of spray coated conductor patterns in which each pattern is comprised of a different material.
Figure 10:
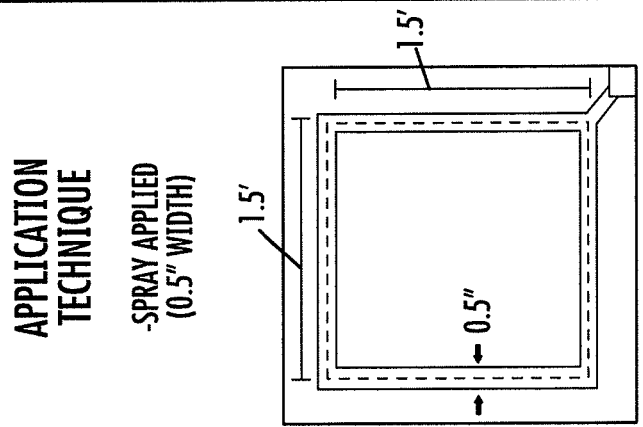

FIG. 10 shows comparative charge measurements for a variety of spray coated non-conductive patterns in which each conductor pattern is comprised of a different material. In particular, each conductor pattern comprised trace lines provided in a generally rectangular orientation having a single trace line connecting the rectangular portion of the conductor pattern to the conductive dissipation point. In each of these experiments, the trace lines within the generally rectangular section of the conductor pattern had a length of approximately 18" and a width of approximately ½". As shown in FIG. 10, the baseline panel (e.g., devoid of a conductor pattern applied to the outer surface of the substrate) failed to exhibit any level of charge dissipation. The other three (3) test panels, however, provided significant levels of charge dissipation and within a relatively quick period of time. For instance a test panel in which the conductor pattern was comprised of ACC4244+ACC4202 (as previously described in relation to FIG. 8 above), available from CROSSLINK (USA), exhibited a reduction of surface charge to less than 50 kV in less than 20 minutes. A test panel using SciCron C-300 provided even better results. In particular, the test panel having trace lines of SciCron C-300 reduced the surface charge to less than 30 kV in roughly 10-12 minutes. Additionally, a test panel comprising trace lines of NOXTAT SDG (e.g., tin oxide nanoparticles in polymethyl methacrylate resin) was prepared and provided the best results as illustrated by the data in FIG. 10. This test panel, for instance, provided a rapid and nearly complete dissipation of all surface charge.

Figure 11:
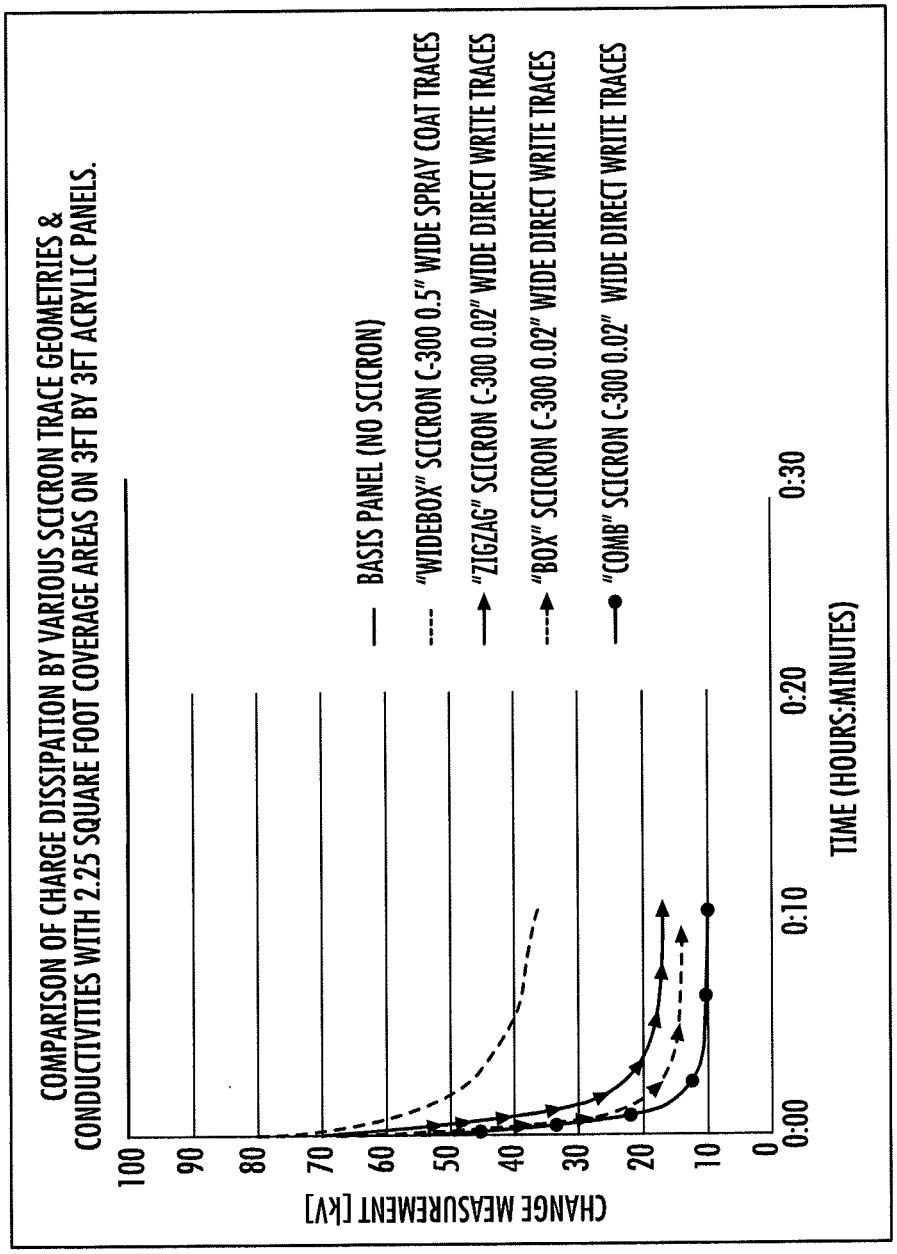
FIG. 11 shows comparative charge measurements for a variety of conductor patterns.

FIG. 11 shows comparative charge measurements for a variety of conductor patterns applied by spray coating or direct writing of the trace lines comprising SciCron C-300. More specifically, FIG. 11 provides charge measurement data for five (5) different test panels. This first panel was a baseline panel, which was devoid of a conductor pattern. The second panel included a conductor pattern having a "wide-box" configuration with ½" wide trace lines spray coated onto the test panel. The third test panel included a conductor pattern having a "zig-zag" configuration (as shown in FIG. 11) with 0.02" wide trace lines applied onto the test pane by direct writing. The fourth test panel included a conductor pattern having a "box" configuration (as shown in FIG. 11) with 0.02" wide trace lines applied onto the test pane by direct writing. The final test panel included a conductor pattern having a "comb" configuration (as shown in FIG. 11) with 0.02" wide trace lines applied onto the test pane by direct writing.

The data provided in FIG. 11 illustrates that each of the test panels having a dissipative surface treatment (e.g., the conductor pattern applied thereto) provided a drastic reduction in electrostatic charge. Notably, each of the test panels including trace lines applied by direct writing exhibiting sharp dissipation of electrostatic charge. For instance, each of the test panels having trace lines applied by direct writing realized a reduction in electrostatic charge to less than 20 kV in less than 5 minutes. Although not wishing to be held to any theory, it is believed that material applied as trace lines via direct writing has better adherence to the substrate than material applied via simpler flow-coating or spray-coating. For instance, simpler coating methods (e.g., flow-coating or spray-coating) are not under anywhere near the tight process control used to guide the direct writing procedure. This tighter process control associated with direct writing, which factors in the geometry of the substrate shape, lends itself to better quality deposition, including material adherence to substrate. Accordingly, in certain preferred embodiments, the trace lines of the conductor pattern are formed by a direct writing process.

Although the specific embodiments set forth in the foregoing tests primarily utilized linear trace lines, including comb-like and zig-zag-like configurations, certain embodiments of the present disclosure can include curved trace lines. Curved trace lines, for example, can be useful when providing a conductor pattern to provide effective dissipation of electrostatic charge over a rounded or curved substrate, such as a windshield or canopy. That is, the geometric configuration of the conductor pattern according to certain embodiments of the present disclosure is not limited to a series of linear trace lines having essentially a uniform width and thickness throughout.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An article, comprising:
   (a) a non-conductive substrate having an inner and outer surface; and
   (b) a conductor pattern comprising one or more trace lines comprising a conductor material, said conductor material comprises a transparent or semi-transparent conductor material and said pattern being deposited only onto a desired portion of the outer surface of the non-conductive substrate;
   wherein said desired portion is less than the entire area of the outer surface.

2. The article according to claim 1, further comprising one or more discharge points located on the outer surface of the non-conductive substrate, said one or more discharge points being operatively connected to the conductor pattern.

3. The article according to claim 1, wherein the conductor pattern comprises a plurality of interconnected trace lines.

4. The article according to claim 1, wherein the non-conductive substrate comprises a transparent substrate.

5. The article according to claim 1, wherein all points of the desired portion of the substrate are at least 18 inches from at least one trace line.

6. The article according to claim 1, wherein the trace lines have a width ranging from 100 to 20,000 microns.

7. The article according to claim 1, wherein the trace lines have a width ranging from 1 to 5000 microns.

8. The article according to claim 1, wherein at least one of the trace lines comprises a varying width including a first section width and a second section width in which the first section width is smaller than the second section width.

9. The article according to claim 8, wherein any trace lines having all or a portion thereof deposited in or proximate to a pilot design eye portion of the non-conductive substrate have the first section width located in or proximate to the pilot design eye portion and the second section width located outside of the pilot design eye portion of the non-conductive substrate.

10. The article according to claim 9, wherein the pilot design eye portion is located on a first side of an aircraft canopy or windshield.

11. The article according to claim 1, wherein the conductor pattern includes at least a first trace line and a second trace line, said first trace line having a smaller width than the second trace line.

12. The article according to claim 11, wherein any trace lines in or proximate to a pilot design eye portion of the non-conductive substrate have a smaller width than trace lines outside of the pilot design eye portion of the non-conductive substrate.

13. The article according to claim 12, wherein the pilot design eye portion is located on a first side of an aircraft canopy or windshield.

14. The article according to claim 1, wherein at least one of the trace lines comprises a varying thickness including a first section thickness and a second section thickness in which the first section thickness is thinner than the second section thickness.

15. The article according to claim 14, wherein any trace lines having all or a portion thereof deposited in or proximate to a pilot design eye portion of the non-conductive substrate have the first section thickness located in or proximate to the pilot design eye portion and the second section thickness located outside of the pilot design eye portion of the non-conductive substrate.

16. The article according to claim 15, wherein the pilot design eye portion is located on a first side of an aircraft canopy or windshield.

17. The article according to claim 1, wherein the conductor pattern includes at least a first trace line and a second trace line, said first trace line having a thinner thickness than the second trace line.

18. The article according to claim 17, wherein any trace lines in or proximate to a pilot design eye portion of the non-conductive substrate have a thinner thickness than trace lines outside of the pilot design eye portion of the non-conductive substrate.

19. The article according to claim 12, wherein the pilot design eye portion is located on a first side of an aircraft canopy or windshield.

20. The article according to claim 4, wherein the non-conductive substrate comprises an acrylic material.

21. The article according to claim 4, wherein the non-conductive substrate comprises a window or canopy of an aircraft.

22. The article according to claim 1, wherein the conductor pattern comprises linear trace lines, curved trace lines, or combinations thereof.

23. The article according to claim 1, wherein the conductor pattern is configured such that an initial surface charge of 100 kV can be dissipated to between 1 and 20 kV in a time period ranging from 1 to 25 minutes.

24. The article according to claim 23, wherein the initial surface charge can be dissipated to between 5 and 20 kV in a time period ranging from 3-20 minutes.

25. The article according to claim 1, wherein the conductor pattern is deposited in a configuration on an aircraft canopy or windshield so as to minimize the visual angle of the conductor pattern for an individual within a cockpit of the aircraft.

26. The article according to claim 1, wherein the transparent or semi-transparent conductor material comprises an electrically conductor polymer, polymer blend, or doped polymer system.

27. The article according to claim 26, wherein the conductor material comprises polyurethane doped with indium tin oxide.

28. The article according to claim 1, wherein the trace lines further comprise a multi-layer coating.

29. The article according to claim 1, wherein the trace lines comprise a single layer coating.

30. The article according to claim 1, wherein the outer surface of the non-conductive substrate includes at least some points located between 6 and 18 inches from one of the trace lines.

31. A method of dissipating electrostatic charge from a non-conductive substrate, comprising: applying a conductor pattern comprising one or more trace lines comprising a transparent or semi-transparent conductor material only onto a desired portion of the outer surface of the non-conductive substrate, wherein said desired portion is less than the entire area of the outer surface.

32. The method according to claim 31, further comprising connecting one or more discharge points to the conductor pattern.

33. The method according to claim 31, wherein the step of applying the conductor pattern onto the non-conductive substrate comprises depositing the pattern only onto a desired portion of the substrate in which dissipation of electrostatic discharge is desired.

34. The method according to claim 31, wherein the conductor pattern comprises a plurality of interconnected trace lines.

35. The method according to claim 31, wherein the step of applying the conductor pattern onto the non-conductive substrate comprises spray-coating, tape application, direct writing, or any combination thereof.

36. The method according to claim 31, wherein the conductor pattern is deposited in a configuration on an aircraft canopy or windshield so as to minimize the visual angle of the conductor pattern for an individual within a cockpit of the aircraft.

37. The method according to claim 31, wherein the outer surface of the non-conductive substrate includes at least some points located between 6 and 18 inches from one of the trace lines.

* * * * *